US011839857B2

(12) United States Patent
Miller

(10) Patent No.: US 11,839,857 B2
(45) Date of Patent: Dec. 12, 2023

(54) FILTRATION MEMBRANE BUNDLE, FILTRATION MEMBRANE ASSEMBLY AND METHOD OF PRODUCING THE SAME

(71) Applicant: i2M LLC, Raleigh, NC (US)

(72) Inventor: Stuart Miller, Clayton, NC (US)

(73) Assignee: i2M LLC, Raleigh, NC (US)

( * ) Notice: Subject to any disclaimer, the term of this patent is extended or adjusted under 35 U.S.C. 154(b) by 540 days.

(21) Appl. No.: 16/889,252

(22) Filed: Jun. 1, 2020

(65) Prior Publication Data

US 2020/0330926 A1    Oct. 22, 2020

Related U.S. Application Data

(63) Continuation-in-part of application No. 15/828,505, filed on Dec. 1, 2017, now abandoned.

(51) Int. Cl.
*B01D 63/02* (2006.01)
*B01D 63/04* (2006.01)
*B01D 63/10* (2006.01)
*B01D 65/00* (2006.01)
*B01D 69/08* (2006.01)
*B01D 71/02* (2006.01)

(52) U.S. Cl.
CPC ......... *B01D 63/027* (2013.01); *B01D 63/021* (2013.01); *B01D 63/022* (2013.01); *B01D 63/023* (2013.01); *B01D 63/043* (2013.01); *B01D 63/10* (2013.01); *B01D 65/003* (2013.01); *B01D 69/08* (2013.01); *B01D 71/02* (2013.01); *B01D 2313/21* (2013.01); *B01D 2319/04* (2013.01)

(58) Field of Classification Search
CPC .... B01D 63/02; B01D 63/023; B01D 63/027; B01D 63/04; B01D 63/043; B01D 63/061; B01D 63/068; B01D 63/10; B01D 63/12; B01D 61/18; B01D 61/145; B01D 69/08; B01D 71/02; B01D 71/024; B01D 2313/146; B01D 2313/13
See application file for complete search history.

(56) References Cited

U.S. PATENT DOCUMENTS

| 3,492,698 | A | 2/1970 | Geary, Jr. et al. |
| 4,172,794 | A | 10/1979 | Sigdell |
| 4,315,819 | A | 2/1982 | King et al. |
| 5,693,230 | A | 12/1997 | Asher |

(Continued)

FOREIGN PATENT DOCUMENTS

EP    1001839 A1    5/2000

*Primary Examiner* — John Kim

(57) ABSTRACT

The present invention concerns a filtration membrane bundle (30) comprising a plurality of elongated filtration fibers (40) arranged in a spiraled coil (34); and one or more filaments (50) woven around the plurality of elongated filtration fibers (40) binding one or more adjacent elongated filtration fibers (40) at a predetermined and homogeneous spacing (44,48) from one another wherein each elongated filtration fiber (40) is bound to respective adjacent elongated filtration fibers (40) in a co-planar configuration, and wherein the co-planar configuration of filtration fibers (40) are rolled into a coil (34). Furthermore, a filtration membrane assembly comprising the filtration membrane bundle (30) and a housing and method of providing the filtration membrane bundle (30) are disclosed.

16 Claims, 6 Drawing Sheets

(56) References Cited

U.S. PATENT DOCUMENTS

| | | | |
|---|---|---|---|
| 5,779,897 A * | 7/1998 | Kalthod | B01D 63/02 210/321.89 |
| 6,113,782 A | 9/2000 | Leonard | |
| 6,203,707 B1 | 3/2001 | Hartmann | |
| 7,303,676 B2 | 12/2007 | Husain et al. | |
| 2012/0018371 A1* | 1/2012 | Cote | B01D 69/085 29/428 |
| 2012/0097604 A1 | 4/2012 | Cote | |
| 2012/0234745 A1 | 9/2012 | Jerman et al. | |
| 2015/0265972 A1 | 9/2015 | Roesink et al. | |
| 2019/0126205 A1* | 5/2019 | Borchardt | B01D 63/021 |

\* cited by examiner

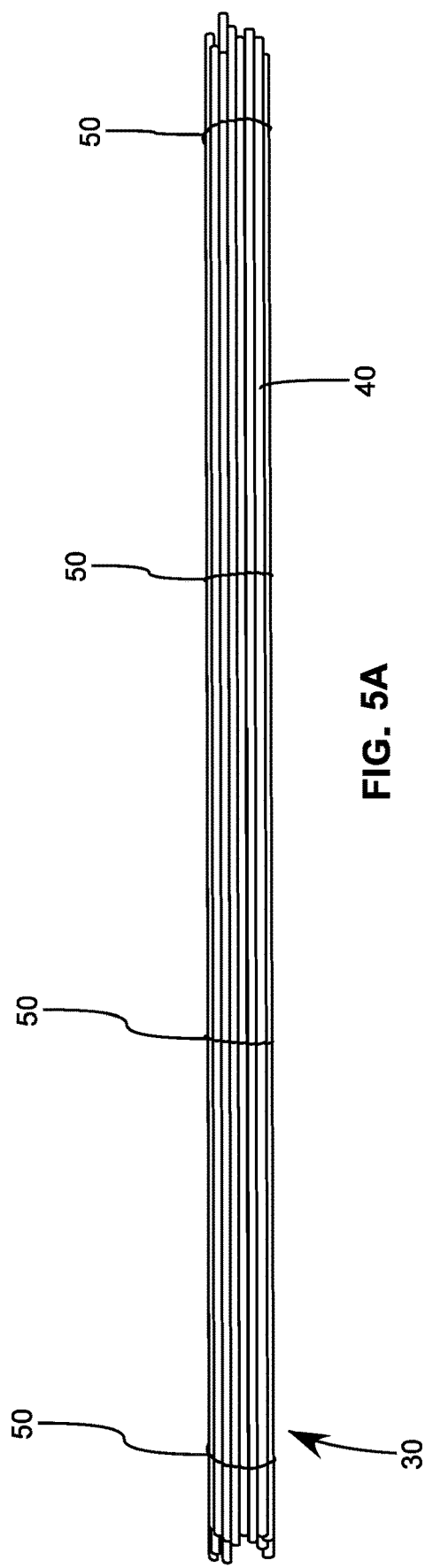
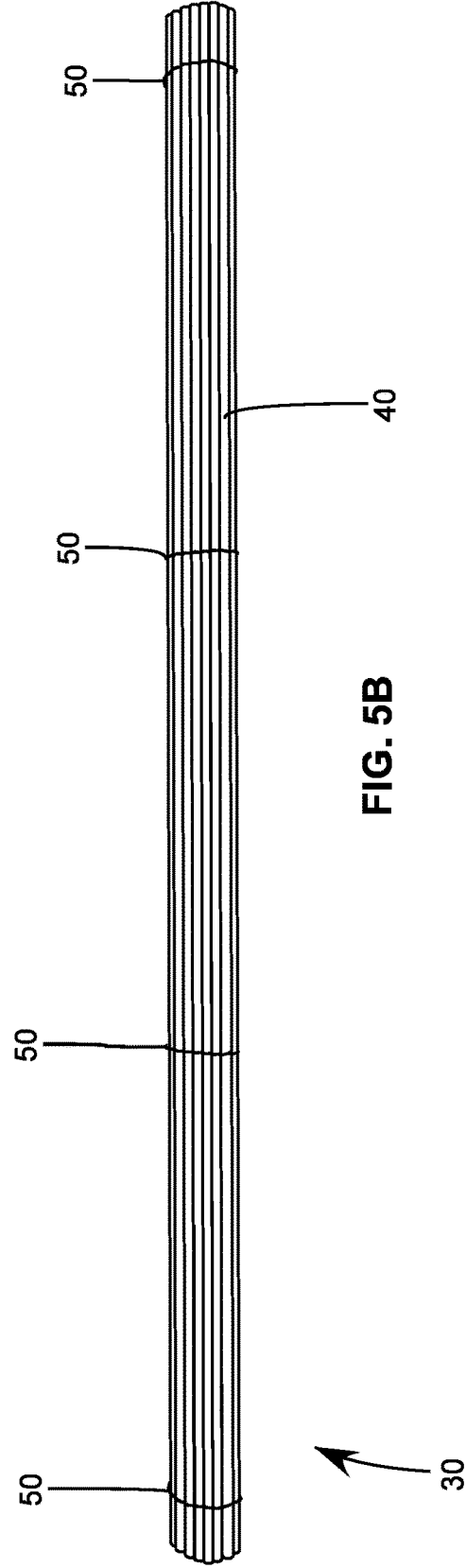
FIG. 5A
FIG. 5B

FILTRATION MEMBRANE BUNDLE, FILTRATION MEMBRANE ASSEMBLY AND METHOD OF PRODUCING THE SAME

CROSS REFERENCE TO RELATED PATENT APPLICATIONS

This application is a continuation of, expressly incorporates by reference, and claims the benefit of and priority to co-pending International Patent Application No. PCT/US2018/063596 filed on Dec. 3, 2018, now abandoned, which is a continuation-in-part application claiming priority to U.S. application Ser. No. 15/828,505 filed on Dec. 1, 2017. The contents of each application are herein expressly incorporated by reference in its entirety.

TECHNICAL FIELD AND BACKGROUND OF THE INVENTION

The present disclosure generally relates to the field of filtration for the purpose of purifying water or other fluid streams, wherein the term "fluid" can comprise gaseous as well as liquid fluids.

Filtration systems operate in a wide variety of applications, even when constrained to water filters. Such filters can be found anywhere from wastewater plants to nuclear power plants, and from commercial application to hospitals. It is well understood that these systems operate in an optimal fashion when the filter elements are replaced or cleaned at very particular intervals. It will be appreciated that these systems have been separate and distinct systems which can be large and burdensome to maintain and/or replace.

SUMMARY OF THE INVENTION

Contemplated herein is a filtration filter membrane bundle and assembly which includes a plurality of elongated filtration fibers being woven or bound together by one or more filaments or strings. The filtration membrane bundle and assembly according to the invention can be used for ultra-filtration purposes, micro-filtration and nano-filtration purposes as well as for reverse osmosis applications and in bioreactors.

In some embodiments, the one or more filaments can be woven around the plurality of elongated filtration fibers, thus binding one or more adjacent elongated filtration fibers at a predetermined and homogeneous spacing, in particular radial spacing, wherein the radial being a direction transverse to the axial direction of the elongated filtration fibers. In particular if the elongated filtration fibers are made of fragile materials like ceramics, it is very important to keep the individual elongated filtration fibers at a specified radial distance in order to prevent contacting each other that could potentially cause damage to the fibers.

In addition, keeping the specified radial distance is of high importance in order to keep the effective filtration surface under varying operation conditions (load, differential pressure and vibration) and to prevent contacting each other which could result in a temporary decrease of effective filtration area and/or destruction of the fibers.

The filaments that are woven around the plurality of elongated filtration fibers act as a mechanical support against neighboring fibers which is an important feature for filtration membrane bundles with elongated filtration fibers having a length that is much larger than the diameter of the individual filtration fibers as the elongated filtration fibers due to their degree of slimness tend to bend about the radial direction what can lead to the challenges described above. Under the term "much longer than wide" a ratio of the length of the elongated filtration fibers of the filtration membrane bundle and an external diameter of the individual fiber between 50 and 1000, preferably between 80 and 500, is to be understood.

Finally, another advantage of keeping the individual filtration fibers of the filtration membrane bundle at specified distances to each other is that this allows a good cleanability of the filtration membrane bundle, especially in an installed state in a housing, as all fiber surfaces are accessible—especially when cleaning is done by flushing the fiber bundle from the outside to the inside—also the fibers in the inside of the coil can be reached by the flushing liquid from the outside. Further all hollow fiber membranes are exposed to the same trans-membrane pressure as the pressure drop for the flow between the fibers is low due to the defined and homogeneous distance, so all fibers are exposed to similar filtration conditions.

In some such embodiments, the one or more filaments can be provided having a woven fiber filament structure. Additionally, the woven fiber filament structure can be provided having at least some para-aramid synthetic fibers, i.e. KEVLAR™. Further, the one or more filaments can be woven around the elongated filtration fibers at a plurality of predetermined axial positions along the respective lengths of the elongated filtration fibers, so as to provide increased stability and maintain proper spacing at various points along the length of the filtration membrane.

In some embodiments the filtration membrane bundle as a whole can be formed by providing a plurality of the elongated filtration fibers in a planar configuration wherein each fiber is arranged adjacent the next and then each adjacent fiber is bound to adjacent fibers using the filament. In this manner, the width of the filament itself maintains proper spacing between adjacent elongated filtration fibers, particularly when woven around an entire circumference of each elongated filtration fiber.

In this manner, respective adjacent elongated filtration fibers are initially provided in a co-planar configuration, while the filament allows for rotation and relative axial flexibility, wherein the plurality of filtration fibers is then rolled into a coil configuration. In this embodiment, because of the weaving of the filament around the entire circumference of each elongated filtration fiber, not only the adjacent planar fibers are properly spaced, but also adjacent elongated filtration members from adjacent coil layers.

The resulting coil of the filtration membrane bundle is preferably of cylindrical shape as this is easy to achieve by rolling the co-planar elongated filtration fibers. But the filtration membrane bundle after rolling can virtually have any shape, e.g. with a triangular or rectangular cross-section, wherein in these configurations the filaments according to the invention allow for keeping the individual filtration fibers at a specified distance as well.

In some embodiments, the elongated filtration fibers can also be provided as tubular ceramic media but the invention comprises polymeric elongated filtration fibers as well as metallic elongated filtration fibers.

In an advantageous embodiment, the entirety of elongated filtration fibers of the filtration membrane bundle can at least at one axial end be y attached to a sealing head having at least one approximately cylindrical sealing surface. Preferably the sealing head is made from or comprises at least one hardenable potting compound. The sealing head, sometimes called a potting head, serves as a structural support for the filtration fibers, keeps them in place and both seals them against each other and provides said approximately cylindrical sealing surface that is adapted to act as a sealing interface against a housing. The sealing head can be advantageously made by molding the hardenable potting compound in said approximately cylindrical shape with at least one mold.

In an especially preferred embodiment, the filtration membrane bundle has sealing heads at both its axial ends.

The inventive concept of keeping the elongated filtration fibers at absolutely homogeneous radial distances by the use of said filaments facilitates the potting process significantly and therefore ensures a complete and very tight sealing of every single fiber as the not yet hardened potting compound is able to penetrate in the fiber gaps efficiently.

Another aspect of the invention concerns a method of providing a filtration membrane bundle. The method comprising the steps:
providing a plurality of elongated filtration fibers and
binding the plurality of elongated filtration fibers so as to have a pre-determined and homogeneous spacing by utilizing one or more filaments woven around the plurality of elongated filtration fibers,
wherein each elongated filtration fiber is bound to respective adjacent elongated filtration fibers in a co-planar configuration and wherein the co-planar configuration of filtration fibers are then rolled into a coil.

As already outlined herein the resulting coil of the filtration membrane bundle preferably is of cylindrical shape as this is easy to achieve by rolling the co-planar elongated filtration fibers. But the filtration membrane bundle after rolling can virtually have any shape, e.g. with a triangular or rectangular cross-section wherein in these configurations the filaments according to the invention allow for keeping the individual filtration fibers at a specified distance as well. To achieve such shapes preferably an adapted rolling technique is employed.

In a preferred embodiment the method can comprise the step: At least at one axial end of the filtration membrane bundle sealingly attaching the entirety of elongated filtration fibers to a sealing head having at least one approximately cylindrical sealing surface, preferably by molding a hardenable potting compound into said approximately cylindrical shape while embedding the elongated filtration fibers.

The technical effect and advantages of the sealing heads has already been outlined in detail with respect to the filtration membrane bundle according to the invention.

According to another especially preferred embodiment at least one of the filaments can be arranged near an axial end of the filtration membrane bundle wherein the at least one filament is at least partially embedded in said sealing head preferably comprising the hardenable potting compound.

Another equally preferred embodiment comprises the step of: After hardening of the hardenable potting compound cutting the sealing head including the embedded entirety of elongated filtration fibers in a perpendicular plane at an axial position beyond the axial position of the at least one filament so that the resulting sealing head is filament-free, i.e. the cut off piece of the sealing head comprise the at least one filament.

This especially preferred modification allows to maintain the main advantage of the invention that is to keep the individual filtration fibers at predetermined and homogeneous spacing from one another, while the filament is only used as an auxiliary production means and does not form a part of the filtration membrane bundle that is produced according to the inventive method. This provides the advantage that the finished cartridge only comprises the sealing head and the plurality of elongated filtration fibers so that a potentially negative impact arising from chemical incompatibility of the filaments, influence of the filaments on the flow and/or insufficient cleanability can be avoided.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIGS. 5A-B illustrate side views how the bound planar filtration fibers of FIG. 3 can be rolled into a spiraled coil and cut to a uniform length prior to use in the filtration membrane assembly of FIG. 1.

DETAILED DESCRIPTION OF THE INVENTION

As discussed above, contemplated herein is a filtration membrane assembly 10 which can be utilized in a variety of applications yet is small and compact. In accordance with this and various other aspects of the present invention the filtration membrane assembly 10 is illustrated in FIGS. 1-6, which allows for a tightly packed assembly of filtration fibers having uniform and predetermined spacing between the various fibers within the assembly.

It will be understood that while the filtration membrane assembly 10 will be discussed primarily with regard to water purification, it can be similarly applied to alternative solutions or fluids as desired. By way of example, such filtration can be utilized for applications ranging from water purification to the industrial applications such as metal separation, pharmaceutical and biopharma production, as well as sugar manufacturing, and even juice or dairy processing and/or gas processing.

It will also be understood that the filtration membrane assembly 10 can have varying configurations with regard to whether contaminated flows are introduced to an interior portion 42 of the filtration fibers 40, where purified flow is then received from an exterior side of the filtration fibers 40, or in contrast whether contaminated flows are introduced to an exterior portion of the filtration fibers 40, where purified flow is then received from an interior portion 42 of the filtration fibers 40. In some embodiments described, this can be achieved by merely switching or reversing the inlet and outlet.

Figure 1:
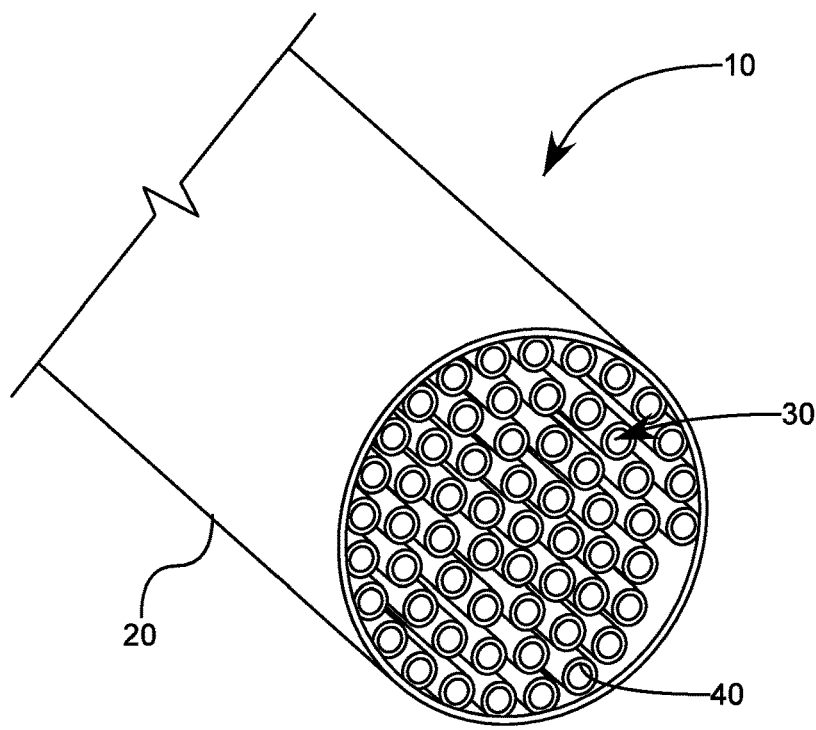
FIG. 1 illustrates a perspective end view of an filtration membrane assembly in accordance with various aspects of the present invention

As such FIG. 1 illustrates a filtration membrane assembly 10 being provided within a housing 20. The housing 20 is shown herein as a cylindrical tube but can be provided having virtually any shape. The housing 20 is configured to receive a filtration membrane bundle 30, the filtration membrane bundle 30 being comprised of a plurality of elongated filtration fibers 40 arranged in a spiraled coil.

Figure 2:
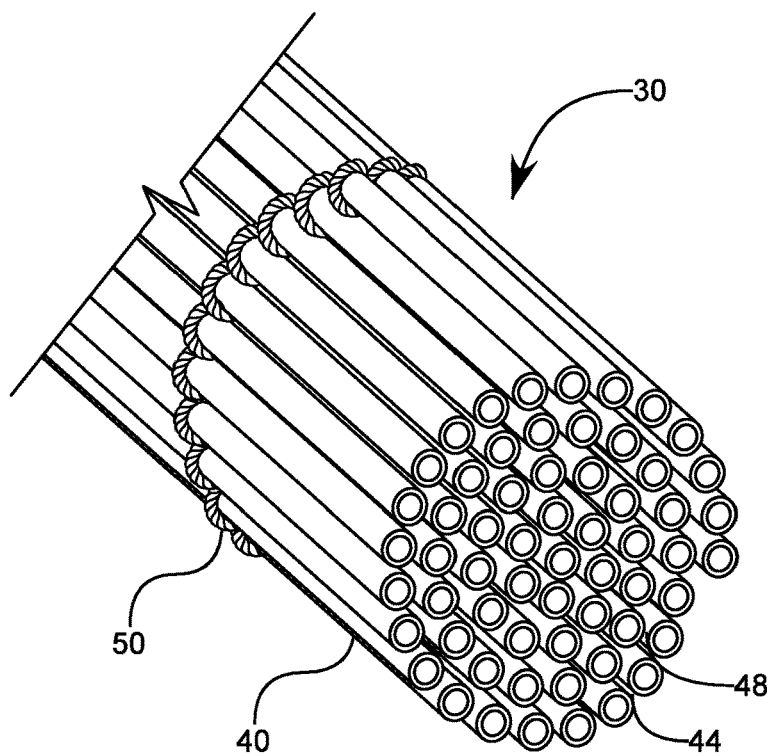
FIG. 2 illustrates a perspective end view of an end portion of a plurality of filtration fibers for use within the filtration membrane bundle of FIG. 1.

The filtration membrane bundle 30 is shown in FIG. 2 as being removed from the housing 20. It will also be understood that the spiraled coil as illustrated herein is provided in a cylindrical or round shape, but could be coiled into any number of other geometric shapes so as to correspond in shape (e.g. having a triangular or rectangular cross-section) to an interior surface of the housing, in whatever shape the housing may take.

As illustrated in FIGS. 2-6, the filtration membrane bundle 30 which includes the plurality of elongated filtration fibers 40 which are bound together using one or more filaments 50, wherein the filaments 50 can be woven around the plurality of elongated filtration fibers 40 thus binding each of the one or more adjacent elongated filtration fibers 40 at a predetermined radial spacing from one another.

Figure 3:
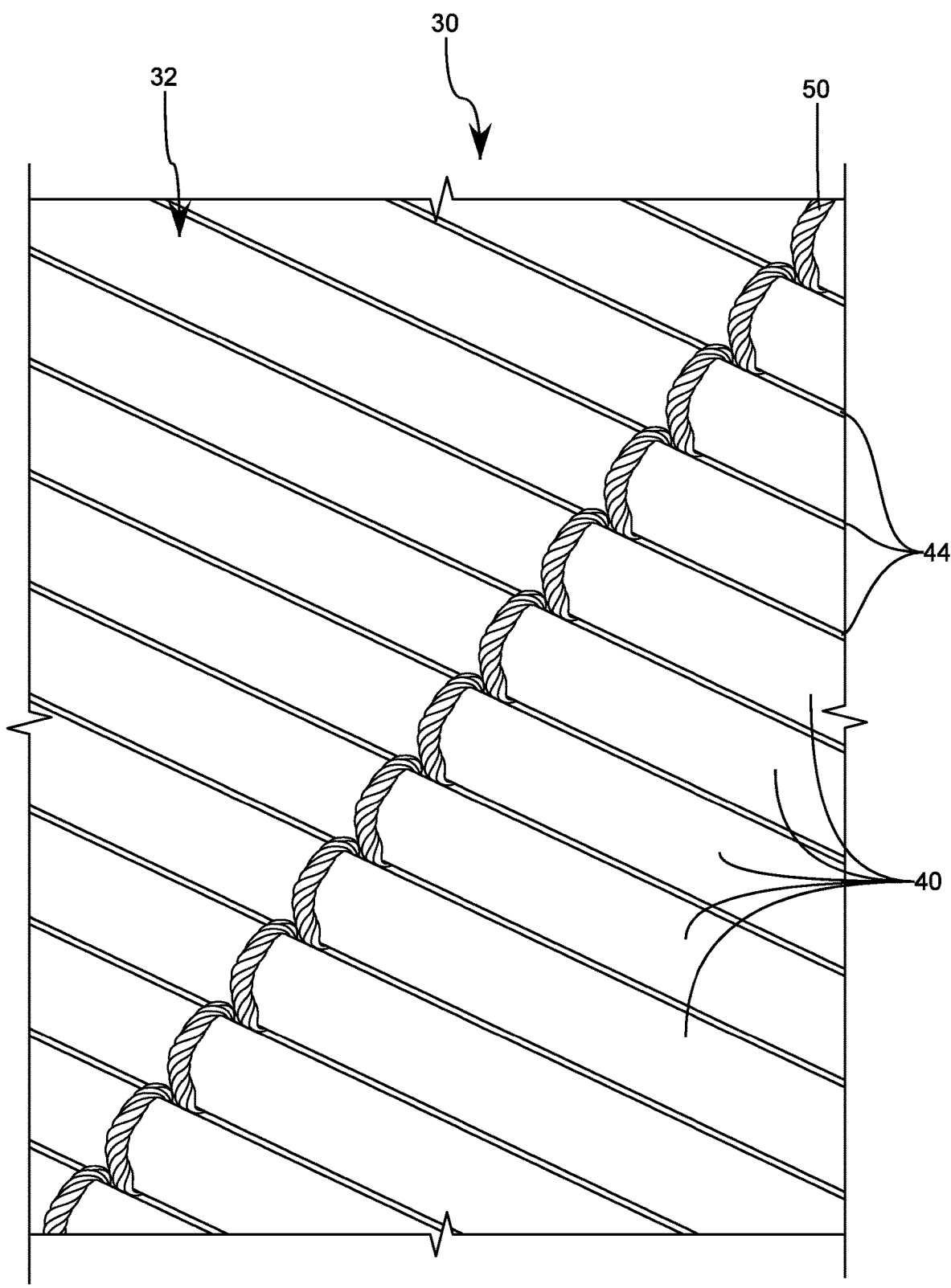
FIG. 3 illustrates a perspective view of a plurality of filtration fibers in a weaving or binding step in a planar configuration for later insertion into the filtration membrane assembly of FIG. 1.
Figure 4A:
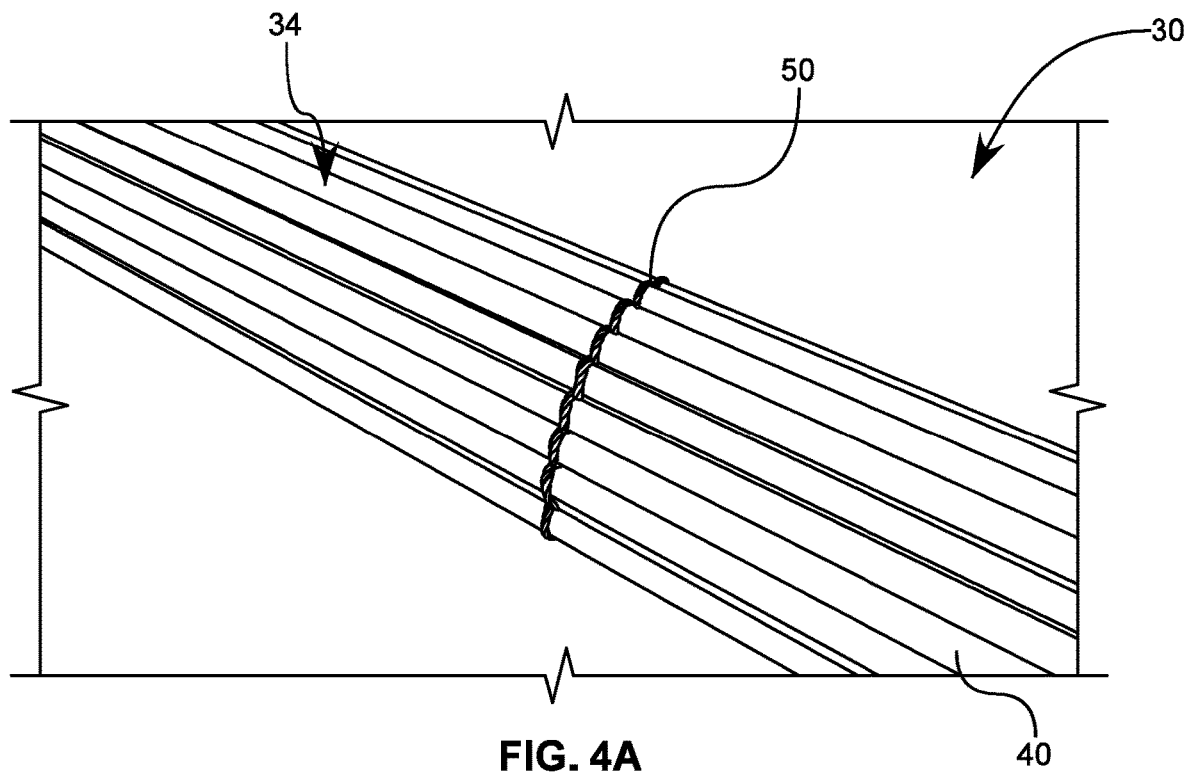
FIGS. 4A-B illustrate perspective views of a filament configuration and resulting filtration fiber spacing of the binding step illustrated in FIG. 3.
Figure 4B:
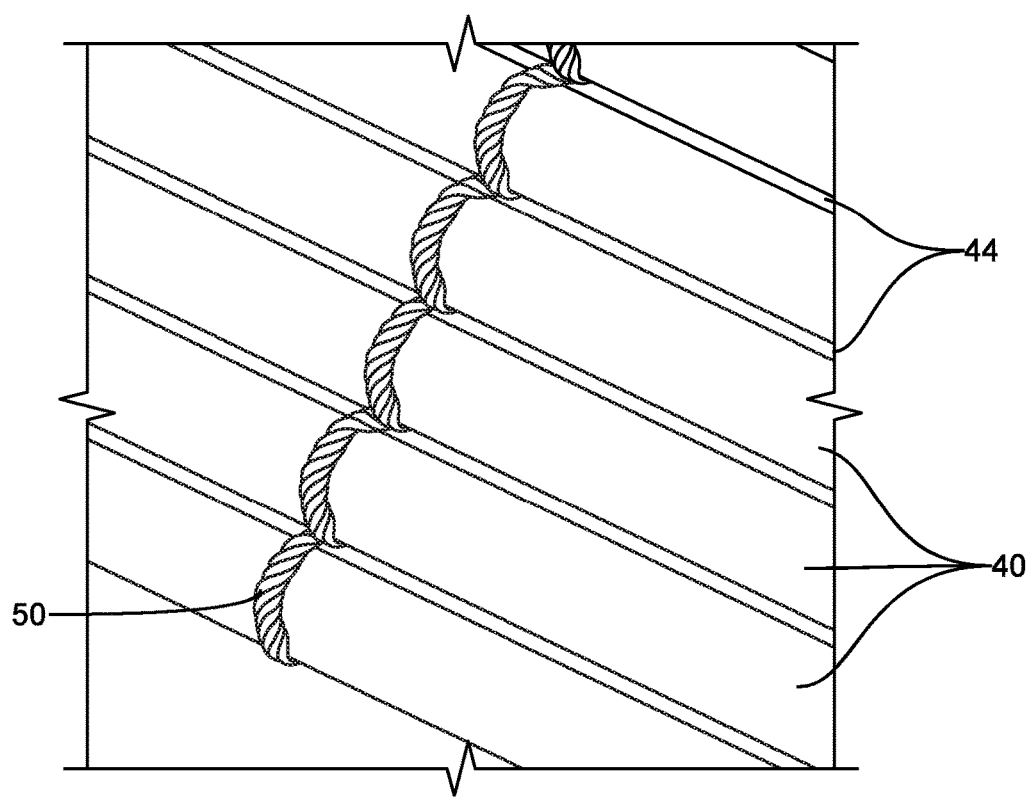
Figure 6:
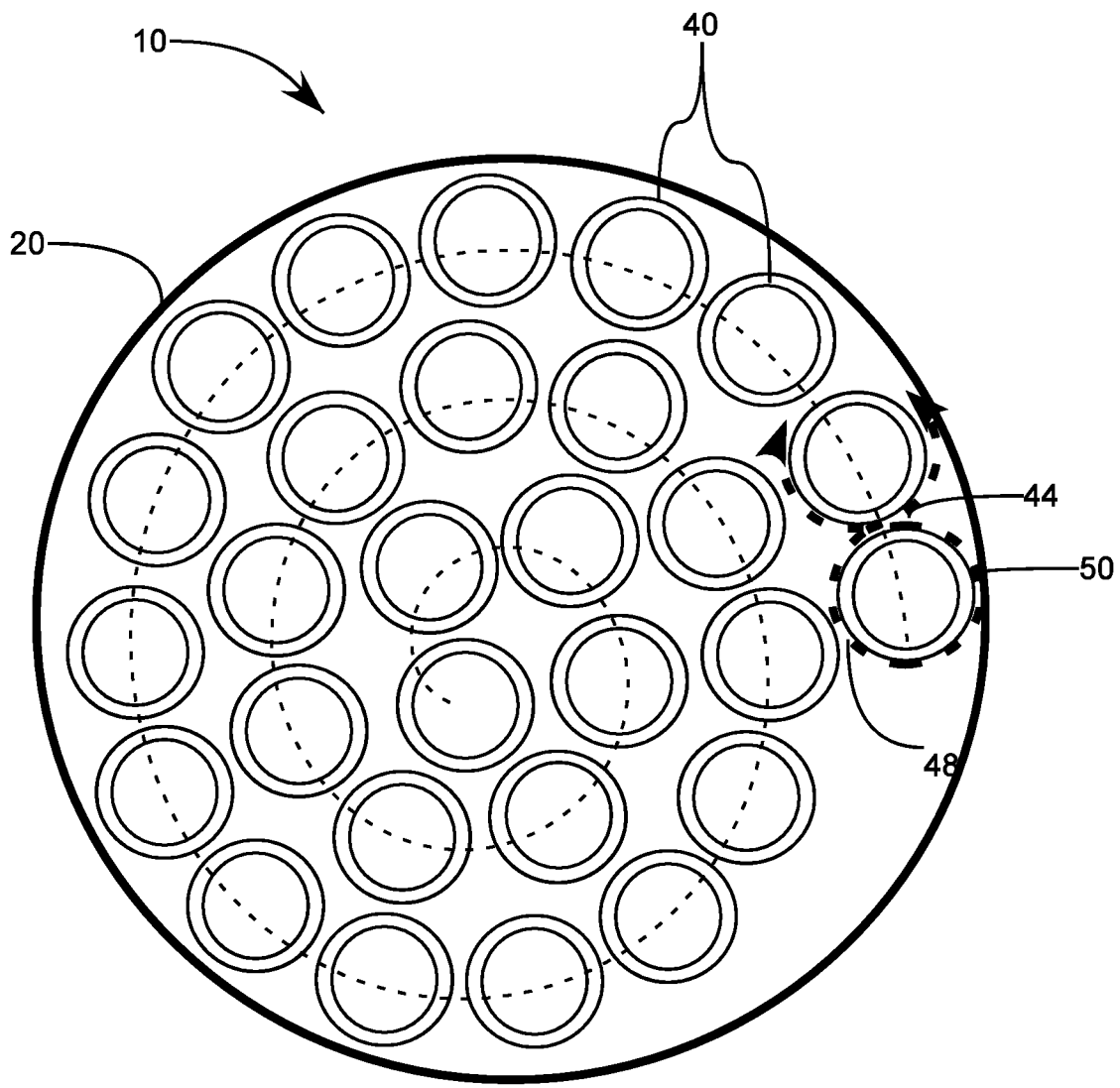
FIGS. 6 and 7 illustrate cross-sectional end views of the filtration membrane of FIG. 1, according to embodiments.

In particular FIG. 3 illustrates an assembly step in which the plurality of elongated filtration fibers 40 are arranged in a co-planar configuration or arrangement and wherein at least one filament 50 is woven between the plurality of elongated filtration fibers 40. As shown herein, the filament 50 is a single strand which is looped and then woven in an over-under configuration such that each of the plurality of elongated filtration fibers 40 have filament 50 extending around an entire circumference thereof. As such, the width of the filament 50 provides the pre-determined spacing between each of the plurality of elongated filtration fibers 40. It will then be understood that the spacing can be varied by providing a filament 50 having a specific pre-determined width, which can vary based on the particular filament used. This width can then be utilized to maintain a predetermined spacing between adjacent elongated filtration fibers 40, this spacing illustrated by the numeral 44, but the spacing will also be similar or consistent between adjacent elongated filtration fibers 40 between coil layers, as illustrated by the numeral 48.

This alternating over-under weaving pattern as shown herein can also be varied. For example, instead of merely alternative between extending over and under each of the plurality of elongated filtration fibers 40, the filament 50 can be twisted or knotted between each of the plurality of elongated filtration fibers 40. Alternatively, knots or other rigid spacers can be provided along the length of the filament at pre-determined intervals so as to provide additional stability or spacing parameters as desired.

In some embodiments the one or more filaments 50 can be provided having a woven fiber filament structure, and in some instances advantages of using a filament formed of or having para-aramid synthetic fibers, i.e. Kevlar™, have been realized.

It will also be understood that the filament 50 can be provided utilizing any number of synthetic or naturally occurring fibers so as to provide the desired spacing, wear, corrosion, or binding strength parameters, as recognized and as necessary for the fluid being filtered by the system.

Certain advantages have also been realized by providing a plurality of filaments 50, as illustrated in FIGS. 5A-B, wherein the plurality of filaments 50 are woven around the elongated filtration fibers 40 at a plurality of predetermined axial positions along the respective lengths of the elongated filtration fibers 40. By providing a plurality of filaments 50, the binding and stability of the elongated filtration fibers 40 can be increased, and the spacing along the entire length between each of the elongated filtration fibers 40 ensured.

As illustrated in FIG. 2, the filament 50 can be woven in a manner such that it extends at an angle between adjacent elongated filtration fibers 40 instead of perpendicular to an axial direction, as defined by a central axis of each elongated filtration fiber 40. In this manner as the co-planar elongated filtration fibers 40 are rolled into a coil or spiral, the filament will then resemble a helical coil and thus prevent the filament 50 from interfering with itself between adjacent coil layers and thus prevent clogging of the filter or preventing flow between the plurality of elongated filtration fibers 40 in use.

As such, for purposes of assembly, each elongated filtration fiber 40 is bound to each respective adjacent elongated filtration fibers in a co-planar configuration, as illustrated in FIG. 3, and then, because the filament 50 is flexible and allows a certain degree of relative rotation, the plurality of filtration fibers can then be rolled into a cylindrical coil configuration as illustrated in FIGS. 2, and 4-6, for placement within the housing 20.

It will be appreciated that the elongated filtration fibers 40 as illustrated herein as a tubular filtration media, and in particular as a ceramic (ultra-)filtration media. It will then be understood that flow can be introduced into a central portion of the tubular elongated filtration fibers 40, wherein a filtered fluid can then be collected from an exterior 46 portion which has passed through the sidewalls thereof. Or, alternatively, flow can be introduced to an exterior sidewall 46 portion, and a filtered fluid can then be collected from an interior portion 42 which has passed through the sidewalls thereof.

Also recognized herein, is that providing elongated filtration fibers 40 each having exactly the same length, and rolling into a coil such that each of the ends line up perfectly can be difficult based on material or coiling process. As such, the elongated filtration fibers 40 can be cut after the coil is formed such that the ends each reside within a particular tolerance threshold one from another.

Another advantage of providing multiple woven sections of filament 50, as shown in FIGS. 5A-B is that in some instances the ceramic filtration fibers can be extremely brittle and fracture easily; especially as the length of the ceramic fibers increase. Thus, the woven fibers placed at predetermined distances can increase the overall strength of the filtration membrane bundle 30. The main effect being that the fibers 40 are kept at predetermined radial spacing thus preventing contact between the individual elongated filtration fibers 40.

The media for the filtration fibers can including resin, ceramic tubes with micro or nano-sized apertures or pathways, other materials with micro or nano-sized apertures or pathways, carbon materials including activated carbon and polymeric media and so forth.

It will then be appreciated that the housing 20 can be filled with a layer of resin or other blocking material such that the flow through the interior portion 42 of each of the elongated filtration fibers 40 can be separated from the flow received from the exterior portion 46 of each of the elongated filtration fibers 40, such as through a sidewall of the housing 20. Alternatively, the interior ends of each of the elongated filtration fibers 40 can be filled with a layer of resin or other blocking material such that the flow through the interior portion 42 of each of the elongated filtration fibers 40 can be separated from the flow received from the exterior portion 46 of each of the elongated filtration fibers 40.

Figure 7:
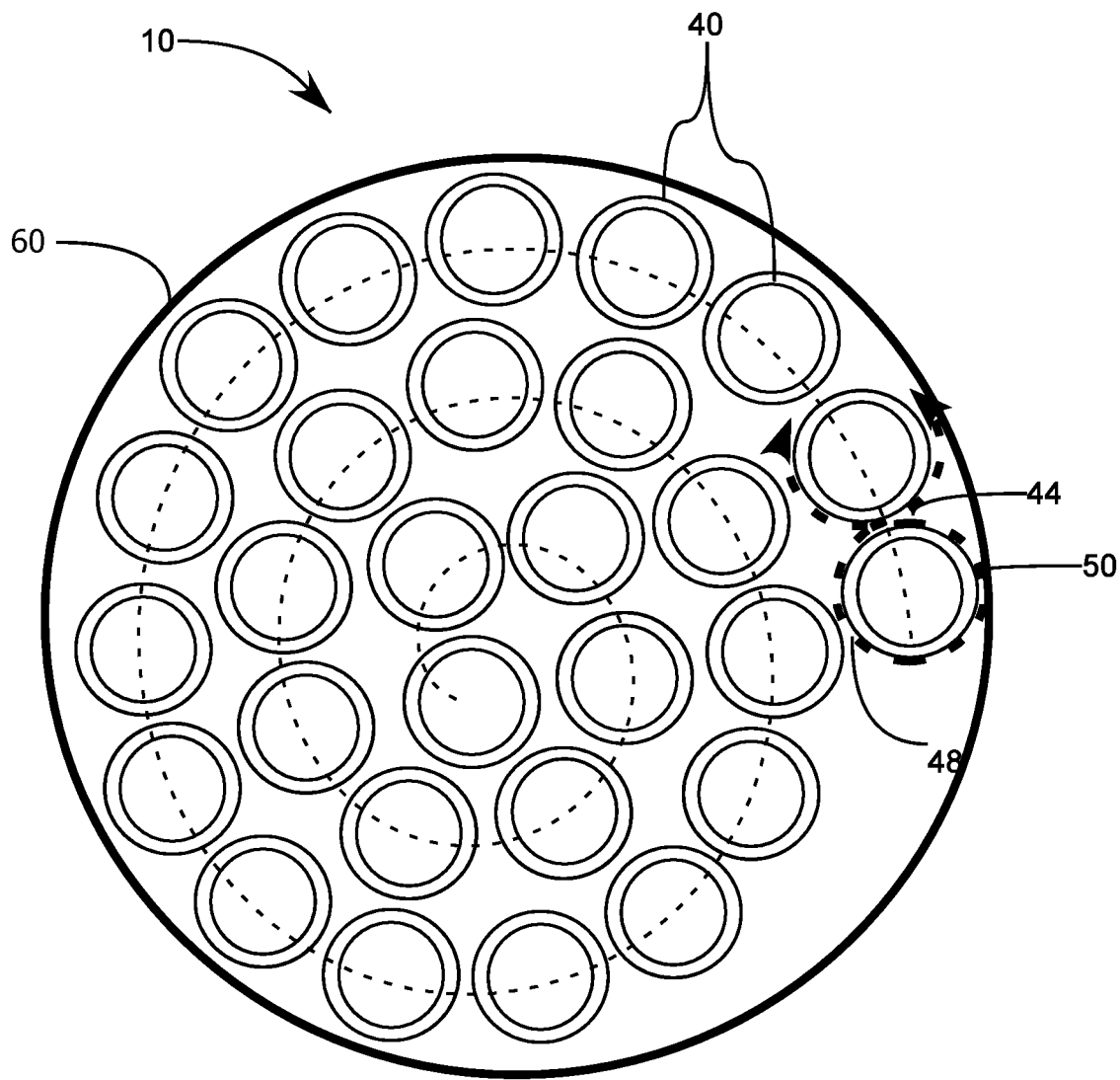

As shown in FIG. 7 the entirety of elongated filtration fibers 40 of the filtration membrane bundle 20 can be sealingly attached to a sealing head 60 at one or both axial ends of the filtration membrane bundle 20. The sealing head 60 has at least one approximately cylindrical sealing surface. Preferably the sealing head 60 is made from or comprises at least one hardenable potting compound. The sealing head 60, sometimes called a potting head, serves as a structural support for the filtration fibers, keeps them in place and both seals them against each other and provides the approximately cylindrical sealing surface that is adapted to act as a sealing interface against a housing 20. The sealing head 60 can be advantageously made by molding the hardenable potting compound in the approximately cylindrical shape with at least one mold.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, media, steps, or other aspects discussed herein are for purposes of illustration only, any of which can be applied in any combination with any such features as discussed in alternative embodiments, as appropriate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

LIST OF REFERENCE NUMBERS 10 filtration membrane assembly
20 housing
30 filtration membrane bundle
32 co-planar configuration of elongated filtration fibers
34 spiraled coil of elongated filtration fibers
40 elongated filtration fibers
42 interior portion
44 spacing between adjacent elongated filtration fibers
46 exterior sidewall portion
48 spacing between coil layers
50 filament
60 sealing head

The invention claimed is:

1. A filtration membrane bundle comprising:
a plurality of elongated filtration fibers arranged in a spiraled coil; and
one or more filaments woven around the plurality of elongated filtration fibers and binding one or more adjacent elongated filtration fibers at a predetermined and homogeneous spacing from one another, the one or more filaments having a woven fiber filament structure formed of para-aramid synthetic fibers, at least one of the one or more filaments being knotted between each of the plurality of elongated filtration fibers,
wherein each of the plurality of elongated filtration fibers is bound to respective adjacent elongated filtration fibers in a co-planar configuration, and
wherein the co-planar configuration of the plurality of elongated filtration fibers is rolled into the spiraled coil.

2. The filtration membrane bundle of claim 1, wherein a plurality of filaments is woven around the plurality of elongated filtration fibers at a plurality of predetermined axial positions along respective lengths of the plurality of elongated filtration fibers.

3. The filtration membrane bundle of claim 1, wherein the plurality of elongated filtration fibers are provided as tubular ceramic, polymeric or metallic media.

4. The filtration membrane bundle of claim 1, wherein an entirety of the plurality of elongated filtration fibers at least at one axial end is sealingly attached to a sealing head having at least one approximately cylindrical sealing surface.

5. The filtration membrane bundle of claim 4, wherein the sealing head is made from or comprises at least one hardenable potting compound.

6. The filtration membrane bundle of claim 5, wherein at least one of the one or more filaments is arranged near an axial end of the filtration membrane bundle, and
wherein the at least one of the one or more filaments is at least partially embedded in the at least one hardenable potting compound.

7. A filtration membrane assembly comprising:
a housing; and
the filtration membrane bundle according to claim 1 provided within the housing.

8. A method of forming a filtration membrane bundle, the method comprising:
providing a plurality of elongated filtration fibers; and
binding the plurality of elongated filtration fibers to have a pre-determined and homogeneous spacing by utilizing one or more filaments woven around the plurality of elongated filtration fibers, the one or more filaments having a woven fiber filament structure formed of para-aramid synthetic fibers, and by knotting at least one of the one or more filaments between each of the plurality of elongated filtration fibers,
wherein each of the plurality of elongated filtration fibers is bound to respective adjacent elongated filtration fibers in a co-planar configuration, and
wherein the co-planar configuration of the plurality of elongated filtration fibers is then rolled into a coil.

9. The method of claim 8, wherein a plurality of filaments is woven around the plurality of elongated filtration fibers at a plurality of predetermined axial positions along respective lengths of the plurality of elongated filtration fibers.

10. The method of claim 8, further comprising sealingly attaching an entirety of the plurality of elongated filtration fibers at least at one axial end to a sealing head having at least one approximately cylindrical sealing surface, by molding at least one hardenable potting compound into an approximately cylindrical shape while embedding the plurality of elongated filtration fibers into the at least one hardenable potting compound.

11. The method of claim 10, wherein at least one of the filaments is arranged near an axial end of the filtration membrane bundle, and wherein the at least one of the one or more filaments is at least partially embedded in the at least one hardenable potting compound.

12. The method of claim 11, wherein after hardening of the at least one hardenable potting compound, the sealing head comprising the embedded entirety of the plurality of elongated filtration fibers is cut in a perpendicular plane at an axial position beyond an axial position of the at least one of the one or more filaments so that the resulting sealing head is filament-free.

13. A filtration membrane bundle comprising:

a plurality of elongated filtration fibers comprising two or more connected adjacent elongated filtration fibers arranged in a co-planar configuration and rolled into a spiraled coil; and one or more filaments looped around an entire circumference of each of the plurality of elongated filtration fibers and binding the two or more connected adjacent elongated filtration fibers at a predetermined spacing, the one or more filaments having a woven fiber filament structure formed of para-aramid synthetic fibers, and at least one of the one or more filaments being knotted between each of the plurality of elongated filtration fibers.

14. The filtration membrane bundle of claim 13, wherein each of the plurality of elongated filtration fibers at an axial end of the filtration membrane bundle are sealingly attached to a sealing head.

15. A method of forming a filtration membrane bundle, the method comprising:

providing at least two elongated filtration fibers;

arranging each of the at least two elongated filtration fibers adjacent to and co-planar to another elongated filtration fiber of the at least two elongated filtration fibers;

looping one or more filaments around a circumference of each of the at least two elongated filtration fibers to bind the adjacent elongated filtration fibers and create a co-planar arrangement of filtration fibers, the one or more filaments having a woven fiber filament structure formed of para-aramid synthetic fibers, and the looping comprises knotting at least one of the one or more filaments between each of the at least two elongated filtration fibers; and rolling the co-planar arrangement into a spiraled coil.

16. The method of claim 15, further comprising embedding at least one axial end of the spiraled coil into a hardenable potting compound.

* * * * *